United States Patent [19]

Bruesselbach

[11] Patent Number: 5,604,829
[45] Date of Patent: Feb. 18, 1997

[54] OPTICAL WAVEGUIDE WITH DIFFRACTION GRATING AND METHOD OF FORMING THE SAME

[75] Inventor: Hans Bruesselbach, Calabasas, Calif.

[73] Assignee: Hughes Aircraft Company, Los Angeles, Calif.

[21] Appl. No.: 423,070

[22] Filed: Apr. 17, 1995

[51] Int. Cl.$^6$ ................................................ G02B 6/34
[52] U.S. Cl. ............................................ 385/37; 359/569
[58] Field of Search ............................... 385/28, 37, 33, 385/10, 123; 359/566, 569, 573

[56] References Cited

U.S. PATENT DOCUMENTS

| | | | |
|---|---|---|---|
| 4,807,950 | 2/1989 | Glenn et al. | 385/123 |
| 4,974,930 | 12/1990 | Blyler, Jr. et al. | 385/28 |
| 5,066,133 | 11/1991 | Brienza | 385/37 X |
| 5,104,209 | 4/1992 | Hill et al. | 385/37 X |
| 5,307,437 | 4/1994 | Facq et al. | 385/37 X |
| 5,313,538 | 5/1994 | Sansonetti | 385/28 |
| 5,327,515 | 7/1994 | Anderson et al. | 385/123 |
| 5,351,321 | 9/1994 | Snitzer et al. | 385/37 |
| 5,367,588 | 11/1994 | Hill et al. | 385/37 |

OTHER PUBLICATIONS

Meltz et al., "Formation of Bragg gratings in optical fibers by a transverse holographic method", *Optics Letters*, vol. 14, No. 15, Aug. 1989, pp. 823–825.

Anderson et al., "Phase–Mask Method for Volume Manufacturing of Fiber Phase Gratings", *Proceedings of the Optical Fiber Conference*, Feb. 1993, papger PD16-1, pp. 68–70.

Leger et al., "Efficient array illuminator using binary–optics phase plates at fractional–Talbot planes", *Optics Letters*, vol. 15, No. 5, Marcy 1990, pp. 288–290.

Saleh, Bahaa E. A., and Teich, Malvin Carl, *Fundamentals of Photonics*, 1991, John Wiley & Sons, Inc., p.801.

Considine, Douglas M., and Considine, Glenn D., editors, Van Nostrand's *Scientific Encyclopedia*, Seventh Edition, 1989, Van Nostrand Reinhold, p. 424.

*Primary Examiner*—Rodney B. Bovernick
*Assistant Examiner*—Hemang Sanghavi
*Attorney, Agent, or Firm*—V. D. Duraiswamy; W. K. Denson-Low

[57] ABSTRACT

A method for forming an index grating in an optical waveguide, such as an optical fiber, with precise control over the grating's period, cross-sectional shape and length. A single writing beam is passed through an optical grating mask, such as a phase mask. A photosensitive waveguide is spaced from the optical grating by a distance that corresponds to an integer fraction of the Talbot self-imaging distance, so that the optical grating (or a desired transformation of it) is imaged in the waveguide core. The grating image has substantially the same cross-sectional shape, period and length as the portion of the optical grating that is illuminated by the writing beam. Thus, an index grating that substantially replicates the cross-sectional shape, period and length of the optical grating mask, which preferably has a substantially square-wave shaped cross-section, is written in the waveguide core. The substantially square-wave shaped cross-section results in higher reflectivity per unit length than prior waveguide gratings with sinusoidal cross-sections. As a result, a high order waveguide index grating may be formed over a waveguide length that is shorter than would previously be required. Alternatively, a low order grating may be formed that has higher reflectivity than a low order sinusoidal grating.

6 Claims, 2 Drawing Sheets

OPTICAL WAVEGUIDE WITH DIFFRACTION GRATING AND METHOD OF FORMING THE SAME

BACKGROUND OF THE INVENTION

1. Field of the Invention

This invention relates to optical diffraction gratings, and more specifically to a method for forming refractive index gratings in photosensitive optical fibers, and the resulting fibers.

2. Description of the Related Art

Optical fiber diffraction gratings are useful for optical communications devices such as single-mode fiber lasers, hybrid semiconductor-fiber lasers, mode converters, optical filters and fiber sensors.

Fiber gratings typically consist of a refractive index grating written in the core of a photosensitive fiber, as described in G. Meltz et al., "Formation of Bragg gratings in optical fibers by a transverse holographic method", *Optics Letters*, vol. 14, no. 15, August 1989, pages 823–825. The photosensitive fiber is typically a silicon fiber with a core that is doped with a material that makes its index of refraction sensitive to its history of exposure to optical radiation of a given wavelength. For example, a silicon fiber doped with germanium exhibits an intense 35 nm wide absorption band centered at 244 nm.

In the transverse process described by Meltz, the diffraction grating is written in the core of the fiber by exposing it to a two-beam interference pattern. The wavelength of the two beams are chosen to coincide with the absorption band in the fiber (for example, 244 nm) and the beams illuminate the core from the side of the fiber. The two interfering beams create sinusoidal light and dark interference fringes in the fiber, which cause a corresponding sinusoidal variation in the refractive index of the fiber core (an index grating). The sinusoidal index grating has the same period as the optical interference fringes. The period of the interference fringes, and hence the period of the resulting index grating, is dependent on the writing angle between the two optically interfering beams and their wavelength. Since there is typically a constraint on the wavelength of the writing beams (it must coincide with the absorption band in the fiber), the index grating period is typically controlled by varying the angle between the two writing beams.

Another method of forming index gratings in fibers is described in Dana Z. Anderson et al., "Phase-Mask Method for Volume Manufacturing of Fiber Phase Gratings", *Proceedings of the Optical Fiber Conference*, February 1993, paper PD16-1, pages 68–70. In this method a single source beam is passed through a phase mask (a phase grating), which diffracts the beam into multiple diffraction orders. The fiber is positioned in close proximity to (but not in direct contact with) the phase mask. The diffracted orders, which have the same function as the writing beams in the Meltz method, interfere in the fiber core and produce a sinusoidal index grating with a period that is equal to the phase mask grating period. With this method, the index grating period will always be equal to the phase mask grating period, regardless of the angle that the source beam makes with the phase mask.

Regardless of which exposure method is used, the fiber index grating will reflect light at its Bragg wavelength, which can be expressed with the equation $\lambda_B = 2n\Lambda/N$, where $\lambda_B$ is the Bragg wavelength (the wavelength reflected by the grating), n is the index of refraction of the fiber, $\Lambda$ is the index grating period and N is the grating order. The sinusoidal gratings produced by the above described method are low order gratings with a grating period that is no larger than twice the primary design wavelength $\lambda_D$ (the primary wavelength that the grating is designed to reflect). These low order gratings reflect light at the fundamental order or, at most, the second order. As the grating period is increased relative to the primary design wavelength (resulting in a higher order grating), less light is reflected at both the fundamental order and at the higher orders for a given grating length.

One can compensate for this phenomenon by increasing the total length of the fiber grating as the grating period is increased. However, some applications impose limits on the fiber length that can be used. In addition, for the interferometric method described by Meltz, costly large aperture precision optical elements would have to be used to form long high order fiber gratings. In the phase mask method described by Anderson, the length of the grating is limited by the length over which the diffracted orders overlap in the fiber and the size of the mask. Chirp-free masks more than a few inches long are very difficult to obtain.

As a result of these limitations, prior fiber grating forming methods have only been used to form gratings that are low order with respect to the design wavelength (the grating period is no larger than twice the primary design wavelength). These gratings exhibit efficient reflectivity at no more than two grating orders (efficient reflectivity at two grating orders is very rare).

It would be advantageous to have high order fiber gratings with relatively high reflectivity at multiple orders. The ability to reflect light at multiple wavelengths using a single fiber grating would expand the flexibility and usefulness of fiber grating devices.

SUMMARY OF THE INVENTION

In view of the above problems, the present invention provides a method for forming a high order index grating in an optical waveguide, such as an optical fiber, with precise control over the grating's period, cross-sectional shape and length. This is accomplished by passing a single writing beam through an optical grating mask, either an amplitude or phase mask. A photosensitive optical fiber is spaced from the optical grating by a distance that corresponds to the Talbot self-imaging distance, or an integer fraction thereof, so that the optical grating is imaged in the photosensitive fiber core. The grating image has the same cross-sectional shape, period and length as the portion of the grating mask that is illuminated by the writing beam. Thus, an index grating that substantially replicates the cross-sectional shape, period and length of the grating mask is written in the fiber core.

Since the index grating that is formed in the fiber has the same length as the portion of the grating mask that is illuminated by the writing beam, a long fiber index grating may be written without the use of the large aperture precision optical elements that would be required if one used the Meltz method. Unlike the Meltz method, the length of the fiber grating formed with the present method is not limited by the overlap of two or more diverging interfering beams.

The cross-sectional shape of the index grating can be easily adjusted by adjusting the cross-sectional shape of the grating mask. In contrast, the sinusoidal cross-section al shape of the index gratings formed by prior methods cannot be adjusted, resulting in the reflectivity problems discussed above.

A fiber index grating with a substantially square-wave shaped cross-section is also provided using the present fiber grating forming method. The square-wave shaped cross-section results in higher reflectivity per unit length than prior fiber gratings with sinusoidal cross-sections. As a result, a high order fiber index grating (one with a grating period that is greater than twice the primary design wavelength) may be formed over a fiber length that is shorter than would be required with prior sinusoidal gratings.

These and other features and advantages of the invention will be apparent to those skilled in the art from the following detailed description of preferred embodiments, taken together with the accompanying drawings, in which:

DETAILED DESCRIPTION OF THE INVENTION

Figure 1:
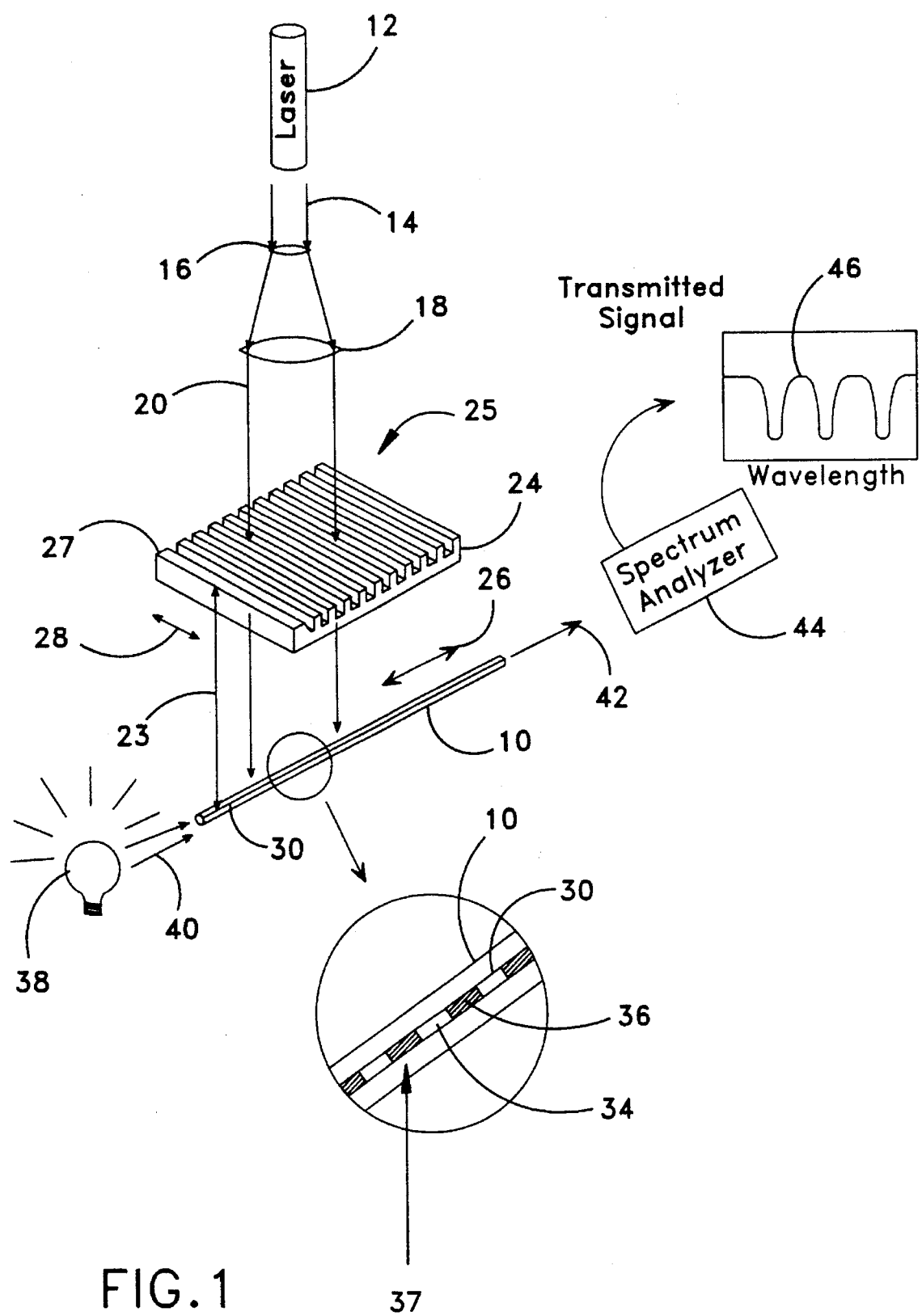
FIG. 1 is a perspective view schematic diagram illustrating the present method for forming an index grating in a fiber.

FIG. 1 illustrates the present method for forming an index grating in an optical waveguide, preferably the core of an optical fiber 10. A coherent optical source 12, such as a laser, is used to generate an optical beam 14. The optical beam 14 must have a wavelength that corresponds to an absorption peak in the fiber 10. The fiber 10 is preferably a single-mode telecommunications optical fiber with a fiber core that is doped with germanium, such as Corning™ SMF-28 fiber. However, the fiber 10 may be made of any photosensitive material whose index of refraction is alterable by exposure to light. As explained above, a fused silica fiber doped with germanium exhibits an intense 35 nm wide absorption band centered at 244 nm. Therefore, the optical beam 14 preferably has a wavelength that lies within this absorption band. This wavelength requirement is preferably satisfied by using a pulsed excimer laser that emits at 248 nm. However, any other laser source, pulsed or con- tinuous-wave, that emits within the desired wavelength range may be used.

The optical beam 14 is expanded and collimated by lenses 16 and 18, and the expanded beam 20 is passed through an optical grating, preferably a phase mask 24. Phase masks are common and are commercially available. Although a phase mask 24 is used in the preferred embodiment, an amplitude grating or any other type of grating that operates in transmission mode may be used. The grating 25 on the phase mask 24 typically consists of ridges 27 that are etched into the phase mask material to a depth that is approximately equal to ½ the writing beam 20 wavelength. The phase mask 24 is preferably formed from a material that transmits the wavelength of the writing beam 20. The eventual fiber index grating will have a period and cross-sectional shape that is substantially identical to the period and cross-sectional shape of the grating 25 on the phase mask 24.

The fiber 10 is spaced from the phase mask grating 25 by a distance 23 that corresponds to ½ the Talbot distance. The Talbot effect, described in J. R. Leger et al., "Efficient array illuminator using binary-optics phase plates at fractional-Talbot planes", *Optics Letters*, vol. 15, no. 5, March 1990, pages 288–290, is a known method of imaging a periodic structure via free-space diffraction. When a periodic object, such as the phase mask grating 25, is illuminated with a coherent optical beam 20, amplitude patterns occur at integer fractions of the Talbot distance. The Talbot distance is equal to $$\frac{2\Lambda^2}{\lambda},$$

where $\Lambda$ is the period of the optical grating 24 and $\lambda$ is wavelength of the optical beam 20 If a phase mask with a 50% fill factor is used, the preferred distance 23 is ½ the Talbot distance $$\left(\frac{\Lambda^2}{\lambda}\right).$$

For illustration, if a 248 nm optical beam is used with a phase mask grating 25 that has a period of 10 µm, the preferred distance 23 is approximately equal to 400 µm. Thus, the fiber would be spaced so that its core 30 is 400 µm (or 400 µm plus an integer fraction of the Talbot distance) from the phase mask grating 25.

The fiber 10 is preferably oriented so that its propagation axis 26 is perpendicular to the phase mask grating direction 28 so that the phase mask grating 25 is imaged in the fiber core with the grating direction 28 perpendicular to the fiber propagation direction 26. The phase mask grating image in the fiber core 30 is a substantial reproduction of the phase mask grating 25, with substantially the same period and cross-sectional shape. The periodic structure of the phase mask grating 25 is reproduced in the fiber core 30 as alternating areas of light 34 and dark 36. The index of refraction in the fiber core 30 is altered at the locations where light 34 is present, resulting in an index grating 37. The length of the index grating 37 is substantially the same as the diameter of the expanded beam 20 or the width of the phase mask grating 25 (measured along the fiber propagation direction 26), whichever is smaller.

The amount of optical energy that is required to expose the fiber index grating 37 depends primarily on how highly absorbing the fiber 10 is at the writing beam 20 wavelength, which is usually dependent on the amount and type of doping in the fiber 10. For illustration, if a 300 millijoule per square centimeter pulsed writing beam at 248 nm is used to expose an index grating in a germanium-doped fiber, one to several thousand pulses could be required depending on the amount of germanium doping. In the preferred embodiment, the grating strength is monitored during exposure by using a broadband light source 38 to launch broadband light 40 into the fiber 10 as the fiber grating 37 is being formed. The transmitted light 42 is monitored by a spectrum analyzer 44. As the fiber grating 37 forms, the spectrum 46 of the transmitted light 42 changes as discrete wavelengths are reflected by the fiber grating 37. The fiber grating formation is stopped when the grating 37 achieves a predetermined strength.

Figure 2:
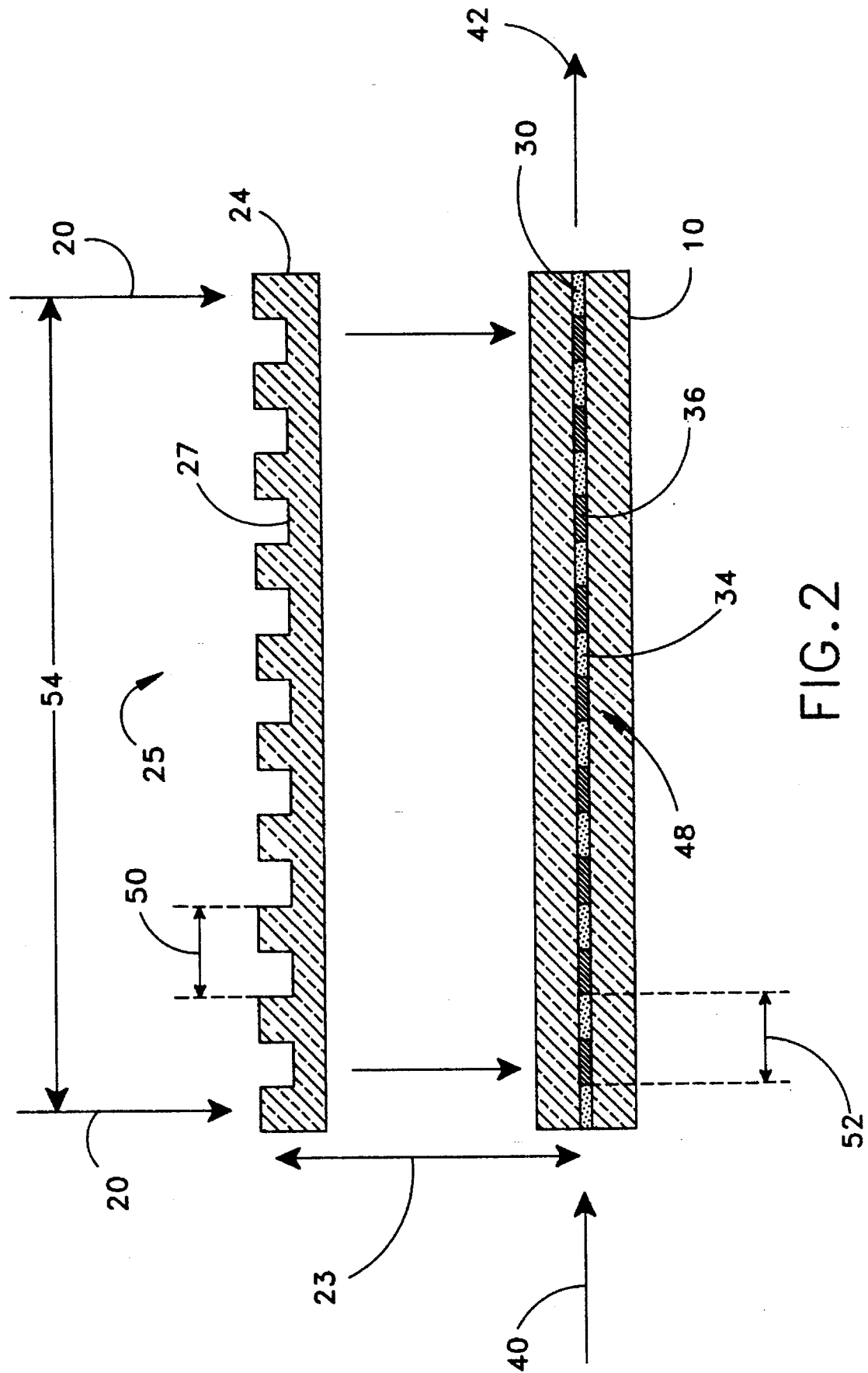
FIG. 2 is a cross-sectional view of the phase mask grating and optical fiber of FIG. 1.

The present method may be used to form a high order index grating 48 in which the grating period 50 is greater than twice the primary design wavelength $\lambda_D$, as illustrated in FIG. 2. For example, if one desires a high order grating that will reflect light at a primary design wavelength of 1.6 µm, then a phase mask grating 25 with a grating period 50 greater than 3.2 microns is preferably used. As explained above, the resulting fiber index grating 48 will have the same period 52 as the phase mask grating 25 and reflect light at $\lambda_B = 2n\Lambda/N$, where $\lambda_B$ is the Bragg wavelength (the wavelength reflected by the grating 48), n is the index of refraction of the fiber 10, $\Lambda$ is the fiber index grating period 52 and N is the grating order. As an illustration, if an index grating period 52 of 10 μm is chosen and the fiber index of refraction is 1.45, the resulting fiber index grating 48 will reflect at 29.0 μm, 14.5 μm, 9.66 μm, 7.25 μm, 5.8 μm, 4.83 μm, 4.14 μm, 3.62 μm, 3.22 μm, 2.9 μm, 2.64 μm, 2.4 μm, 2.23 μm, 2.1 μm, 1.93 μm, 1.8 μm, 1.7 μm, 1.6 μm, 1.53 μm, 1.45 μm, 1.38 μm, 1.32 μm, 1.26 μm, 1.21 μm, . . . etc. Unlike prior methods, the present method allows one to easily increase the length of the fiber grating 48 to compensate for the lower reflectivity that results at higher orders. This is done, as explained above, by increasing the diameter 54 of the writing beam 20 as long as the phase mask grating 25 is large enough to accommodate the larger writing beam 20. Alternatively, a long fiber grating may be fabricated by using a smaller diameter writing beam 20 and exposing multiple shorter gratings in the fiber core 30. This is preferably done by translating the fiber 10 along the fiber propagation direction 26 after each short grating exposure. The fiber translation is preferably accomplished by mounting the fiber on a translation stage (not shown).

Another feature of the present method is the ability to control the cross-sectional shape of the fiber index grating 48 by controlling the cross-sectional shape of the phase or amplitude mask grating 25. In the preferred embodiment, a phase mask grating 25 with a substantially square-wave shaped cross-section is used. The resulting fiber index grating 48 exhibits sharp index transitions which are more efficient at reflecting light than the more gradual index transitions exhibited by prior sinusoidal index gratings. As a result, the high order substantially square-wave shaped index grating 48 may be formed over a shorter length of fiber than would be required if sinusoidal gratings were used. Alternatively, a low order grating may be formed that has higher reflectivity than a low order sinusoidal grating.

While several illustrative embodiments of the invention have been shown and described, numerous variations and alternate embodiments will occur to those skilled in the art. For example, the present method may be used to expose index gratings in any optical waveguide whose index of refraction is alterable by exposure to light. Any coherent optical source may be used as long as the wavelength of the writing beam is matched to an absorption peak in the optical waveguide. In addition, a key feature of the present method is the ability to define the cross-sectional shape, period and length of the fiber index grating with the phase mask grating. Although the formation of a high order fiber index grating with a substantially square-wave shaped cross-section was described as an illustrative example, the cross-sectional shape and period of the fiber index grating may be customized for a particular application by making appropriate changes to the phase mask grating shape, period and length, and adjusting its distance from the fiber. Such variations and alternate embodiments are contemplated, and can be made without departing from the spirit and scope of the appended claims.

I claim:

1. A method of forming a high-order diffraction grating in a photosensitive optical waveguide for reflecting a first optical beam at a design wavelength and at other wavelengths, comprising the steps of:

generating a second optical beam having a wavelength that corresponds to a wavelength to which said waveguide is photosensitive, passing said second beam through an optical phase grating with a non-sinusoidal cross-sectional shape, said grating having a period that is more than twice the design wavelength, and that is an integer multiple of the design wavelength, directing said second optical beam to said photosensitive waveguide, spacing said waveguide from said phase grating by a distance that corresponds to an integer fraction of the Talbot self-imaging distance so that said optical grating is imaged in said waveguide as alternating light and dark regions that have substantially the same period and cross-sectional shape as said phase grating, said alternating light and dark regions establishing a refractive index grating in said waveguide with substantially the same period and cross-sectional shape as said phase grating.

2. The method of claim 1, wherein said phase grating has a substantially square-wave shaped cross-section so that the cross-section of the alternating light and dark regions in said waveguide is substantially square-wave shaped.

3. The method of claim 2, wherein said design wavelength is approximately 1.6 microns and said phase grating has a period of approximately 10 microns.

4. The method of claim 1, wherein said waveguide is spaced from said phase grating by an amount approximately equal to $$\frac{\Lambda^2}{\lambda},$$

where $\Lambda$ is the period of said phase grating and $\lambda$ is the wavelength of said second optical beam.

5. The method of claim 1, wherein said second optical beam is directed to a photosensitive optical fiber that is single-mode with respect the wavelength of said first beam.

6. The method of claim 5, wherein said index grating is established at a core of said fiber.

* * * * *